Jan. 22, 1935.  H. G. LYKKEN  1,988,660
CONCRETE SURFACING DEVICE
Filed May 23, 1929   3 Sheets-Sheet 1
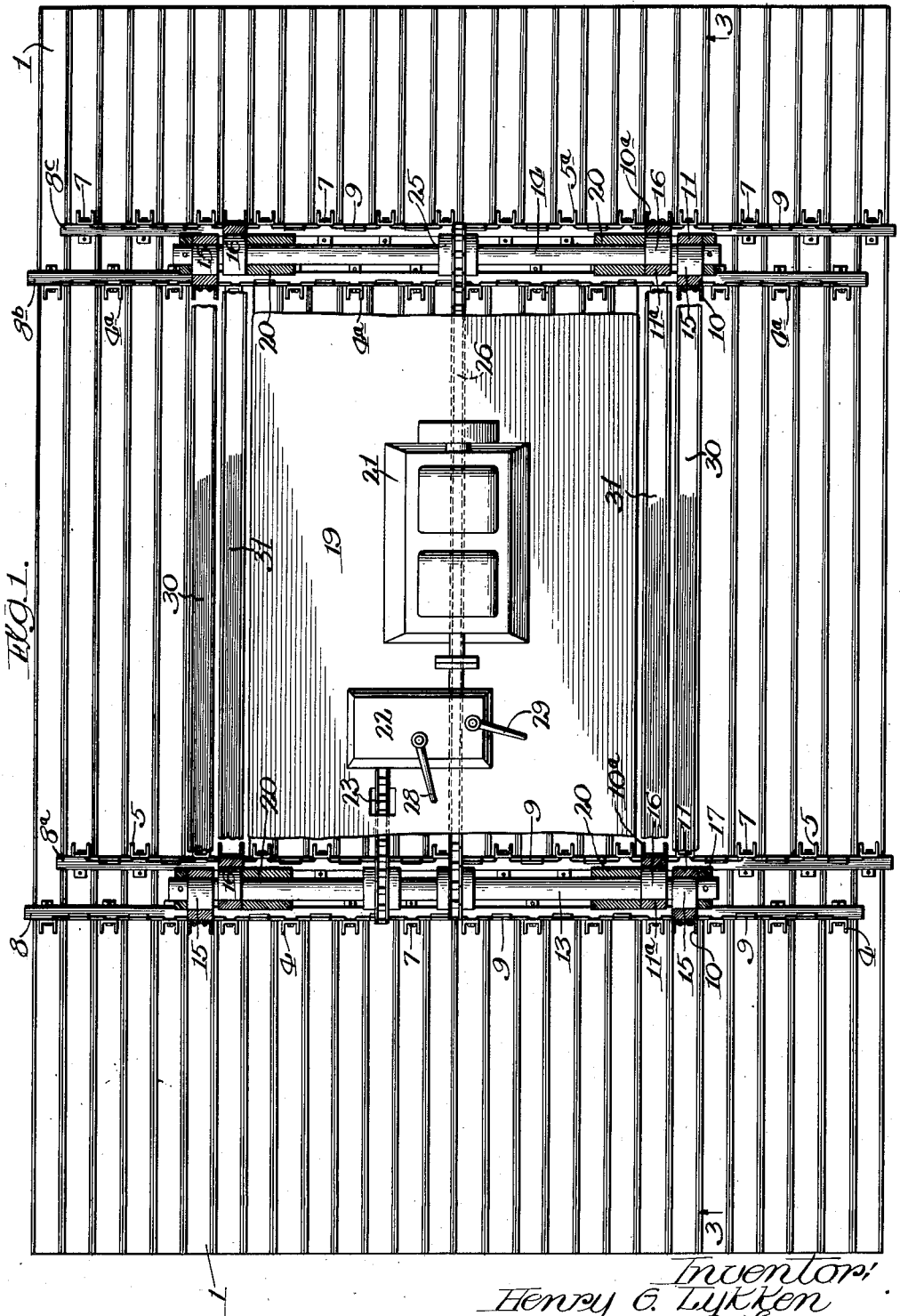
Inventor:
Henry G. Lykken
By: Wallace R. Lane Atty.

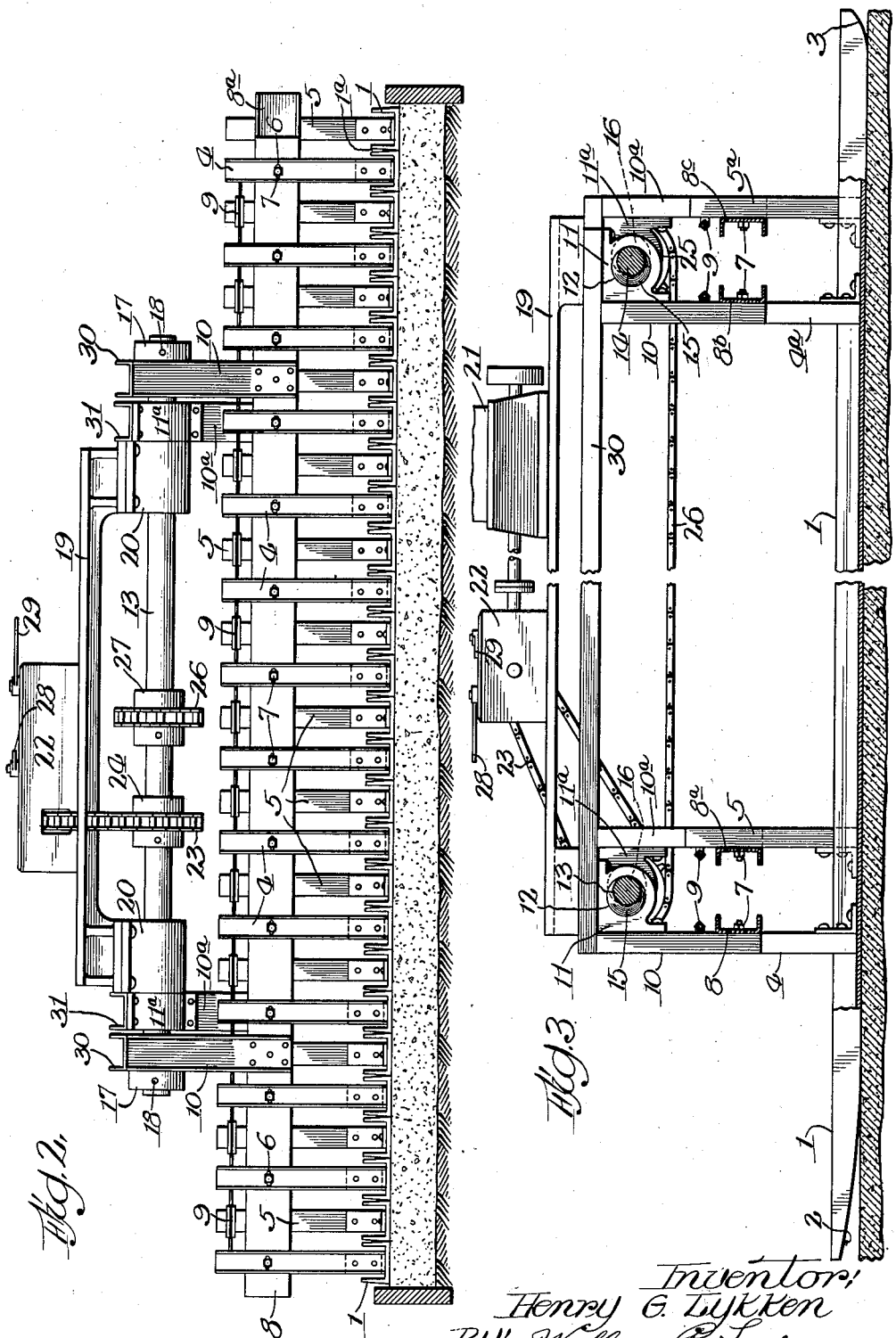

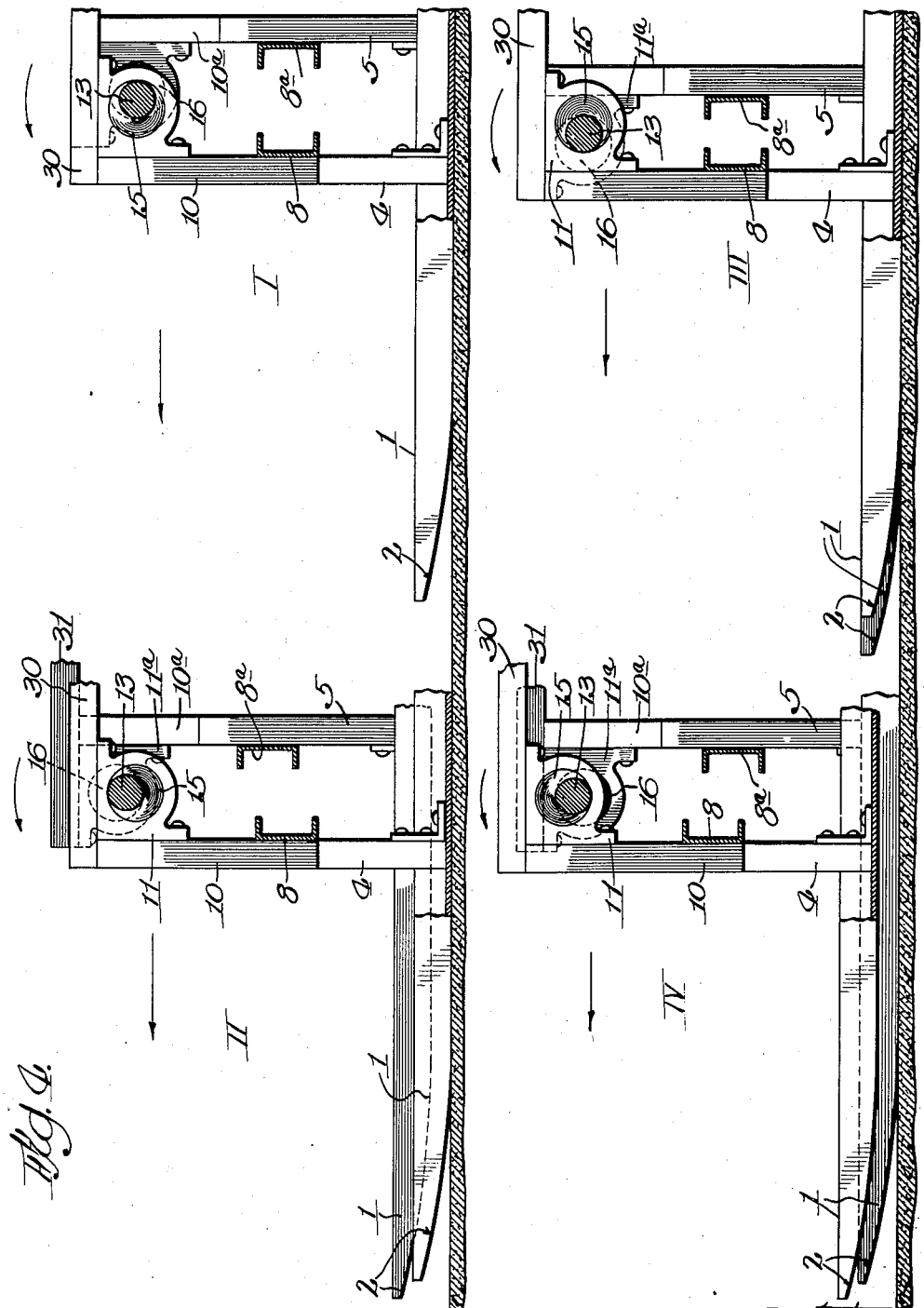

Patented Jan. 22, 1935

1,988,660

UNITED STATES PATENT OFFICE 1,988,660

CONCRETE SURFACING DEVICE

Henry G. Lykken, Minneapolis, Minn.

Application May 23, 1929, Serial No. 365,424

8 Claims. (Cl. 94—49)

The present invention relates to the surfacing of plastic materials, such as concrete or the like.

Among the objects of the invention is to provide a novel device for and a novel method of surfacing plastic materials, such as for example, concrete or the like, which may or may not be placed within or confined in forms or the like.

The invention comprehends the idea of providing means for tamping and compacting a plastic body of material which will knead and work the body into a homogeneous mass and to finish the surface thereof.

The invention also comprehends the provision of a novel device adapted to ride solely upon the surface of the plastic material to be compacted and tamped, and to tamp and work the material as it progressively moves thereover.

Another object of the invention is to provide a novel device in which the surface forming elements thereof may be raised and lowered, as they are caused to move over the surface of a plastic material, to tamp and work the plastic material to form a homogeneous plastic body of material, and to simultaneously finish the surface thereof to form a smooth and even surface.

The invention further comprehends the idea of providing a novel means for advancing the surface forming elements as they are raised and to lower them in an advanced position to progressively move the surface forming elements over the surface of a plastic body of material upon which they rest, so as to continuously compact and work the body of material to produce homogeniety in the body and to finish the surface thereof.

The invention still further comprehends the idea of providing means for carrying a power unit on the device for operating the mechanism which lifts and advances the surface forming elements.

It is still a further object of the invention to provide a novel device in which alternate surface forming elements are raised and advanced alternately to compact and work the body of material upon which the surface forming elements are carried to produce homogeniety in the body and finish the surface thereof.

It is also an object of the invention to provide a novel device for surfacing and compacting a plastic body of material in which means are provided for varying the angular relation between the surface forming elements. With means of this kind the device is particularly adapted for surfacing a concrete road or the like where it is desirable to provide a convex or crowned surface. A concave surface may also be formed by adjusting the angular relation of the surface forming elements oppositely to the adjustment necessary to obtain a convex finished surface.

Other objects, advantages, features and capabilities are comprehended by the invention as will later appear, and as are inherently possessed thereby.

Referring to the drawings:

Fig. 1 is a top plan view of a device constructed in accordance with the invention with parts cut away to show in detail the construction of certain of the members in the device.

Fig. 2 is a view in end elevation of said device.

Fig. 3 is a view in side elevation taken in the plane represented by line 3—3 of Fig. 1 of the drawings.

Fig. 4 discloses fragmentary views in side elevation and showing consecutive positions of the surface forming elements at each 90° turn of the cam members which advance the device over the surface of a plastic material.

Referring now more in particular to the drawings, the embodiment selected to illustrate the invention comprises a plurality of channel-shaped elongated flat elements or members 1 having slightly inwardly inclined side flanges 1ª and upwardly curved forward end portions 2, so that the elements may be easily moved over the surface of a plastic material without danger of digging into the material and preventing ready manipulation of the device. Members 1 have slightly upturned rear end portions 3 so that the finished surface of the plastic material will be free from ridges and unevenness as the elements 1 progressively advance over the material to be finished.

The elements or members 1 are in contact in a lateral direction and each alternate member is provided with a vertical or upright member 4 connected thereto adjacent to the forward end and a similar member 4ª connected thereto adjacent to the rear end.

The members or elements adjacent to the members having the upright members 4 are provided with upright members 5 connected to the members 1 at a point a short distance to the rear of the upright member 4 and are likewise provided with upright members 5ª connected adjacent to their rear end and a slight distance to the rear of the upright member 4ª.

Each of the upstanding members 4, 4ª, 5 and 5ª, is provided adjacent to its upper end, with an arcuate shaped slot 6 adapted to receive a bolt 7 passing through the extending or cross-member 8, 8a, 8b or 8c and the upright members. This permits relative movement between the cross-members and the upright members when adjusting the upright members relative to each other, after which the tightening of the nuts on the bolts secures the parts in adjusted relation.

Each of the upstanding members 4 is connected with its adjacent upstanding member 4 by a suitable adjusting means, such as a turn-buckle 9 whereby the angular relation of the longitudinal members 1 in a transverse direction may be varied, assuming that the nuts on the bolts 7 have previously been loosened to allow lateral movement of the upright members 4. After adjusting the angular relation, the bolts are then tightened.

Similar cross members 8a, 8b, and 8c and similarly provided adjustable means, are provided for the upright members 5, 4a and 5a respectively. By a proper adjustment of these upright members, the elongated members 1 of the device may be so positioned as to give a convex or concave surface to the plastic material over which it is moved.

Adjacent to the ends and connected by any suitable means, to the cross-members 8 and 8b, are vertical members 10, to which are connected brackets 11 having circular openings 12 therein. Also vertical members 10a carrying brackets 11a having circular openings 12 and similar to brackets 11, but oppositely mounted, are connected adjacent the ends of the cross members 8a and 8c. They are likewise adjacent to the vertical members 10.

Shafts 13 and 14 having cam elements 15 and 16 oppositely mounted thereon are provided, the cam elements 15 being rotatable in the circular openings 12 in the brackets 11, while the cam elements 16 are rotatable in the circular openings 12 in the brackets 11a. Collars 17 mounted on the ends of the shafts 13 and 14 and secured thereto by pins 18, are provided to hold the shafts in operative position and to prevent axial displacement of the shafts.

A platform 19 of any desired construction is mounted on the hubs 20 on the shafts 13 and 14, and carries a motor 21 mounted thereon to drive through the transmission 22 and sprocket chain 23, the sprocket wheel 24 secured to the shaft 13.

The shaft 14 is driven at the same speed by the sprocket wheel 25 secured to it and driven by way of a chain 26, driven from a sprocket 27 fixed to the shaft 13.

A suitable clutch mechanism is provided in the transmission 22 and is controllable by the lever 28 for operatively connecting the motive means to the sprocket wheel 24 and shafts 13 and 14. There is also a speed control mechanism controlled by a hand lever 29 for varying the speed of rotation of the shafts 13 and 14 and the rate of movement of the device over the surface of a plastic body upon which it rests.

Longitudinal members 30 on opposite sides of the platform 19 are provided to connect the upright members 10 on the cross members 8 and 8b. Similar longitudinal members 30 are provided to connect the upright members 10a on the cross members 8a and 8c. These longitudinal members reinforce and brace the alternate units of surface forming elements 1 and the upright members to prevent warping and twisting of the units as the device is moved over the surface of a plastic material.

As the shafts 13 and 14 are rotated by the motor 21, the cam elements mounted thereon will assume the various positions as clearly shown in the Fig. 4 of the drawings. As shown in position I (in this figure), all of the elongated members are resting upon the surface of the plastic material. As the shaft is rotated, as to position II, to cause rotation of the cam element 16 about the center of the cam element 15, the alternate elongated members 1 connected with the upright members 5 and 5a, will be lifted or elevated and advanced a short distance. A further rotation of the shaft, and likewise cam element 16 about the center of the cam element 15, will cause a further advancing of such elongated members 1, as shown in position III of Fig. 4. As the shaft is still further rotated to the position as shown in position IV of Fig. 4, the shaft and cam element 15 then rotate about the center of the cam element 16 to lift the alternate elongated elements 1 connected to the upright members 4 and 4a and to cause them to be advanced a short distance. A further rotation of the shaft and cam element 15 about the center of the cam element 16 causes a further advancing of these same elements, such as shown in position I of Fig. 4, but advanced a distance equal to the eccentricity of the cam elements. Continual rotation of the shaft will cause a successive advancing of alternate elements over the surface of the plastic material to be finished.

It will be seen that as these elongated members are lifted and lowered and advanced over the plastic material, that they will tamp, compact and work the same into a homogeneous mass as well as to surface the material so that it will be free from unevenness and ridges.

By providing means for adjusting the upright members to vary the angular relation of the elongated members, it will be seen that the device may be used to form a concave or convex surface, as likewise by the proper adjustment, a compound surface having flat portions together with either concave or convex surface portions, may be obtained.

While I have herein described and upon the drawings shown an illustrative embodiment of the invention, it is to be understood that the latter is not limited thereto, but comprehends other details, arrangements of parts, features and constructions without departing from the spirit thereof.

Having thus disclosed the invention, I claim:

1. A surfacing device comprising a plurality of surface forming elements, means connecting alternate elements to form units, said means adapted to hold said elements in contact laterally, means for varying the angular relation between said elements, and means carried by said elements and connected to said connecting means for alternately lifting and advancing said units for progressively moving said elements and said device over the surface of a plastic material to knead and compact the same.

2. A surfacing device comprising a plurality of surface forming elements, means connecting alternate elements to form units, cams associated with each of said units, and power means carried by said elements for rotating said cams to alternately lift and advance said units for progressively advancing said elements and said device over the surface of a plastic material to knead and compact the same.

3. A surfacing device comprising a plurality of surface forming elements, means connecting ing the angular relation between said elements, cams carried by said units, and power means mounted on said elements and adapted to rotate said cams to alternately elevate and advance said units for progressively advancing said elements over the surface of a plastic material to knead and compact the same, said elements supported by said material and carrying said device.

4. A surfacing device comprising a plurality of surface forming elements, means connecting alternate elements to form units, means for varying the angular relation between said elements, a shaft extending laterally of said elements, cams mounted upon said shaft, said shaft and cams carried by said elements, and power means mounted on said elements and adapted to rotate said shaft and cams to cause said units to be alternately elevated and advanced to progressively move said elements over the surface of a plastic material to knead and compact the same, said elements comprising the moving means for said device.

5. A surfacing device comprising a plurality of elongated surface forming elements, upstanding members connected to said elements, cross-members connecting alternate upstanding members to form units, said cross members provided with brackets, a shaft, cams oppositely mounted on said shaft and rotatably carried in said brackets, power means mounted on said members and adapted to rotate said shaft and cams to cause said units to be alternately elevated and advanced to progressively move said elements over the surface of a plastic material to knead and compact the same, said elements carrying said device.

6. A surfacing device comprising a plurality of elongated surface forming elements, means for varying the angular relation between said elements, upstanding members connected to said elements, cross-members connecting alternate upstanding members to form units, said cross members provided with brackets, a shaft, cams oppositely mounted on said shaft and rotatably carried in said brackets, power means mounted on said members and adapted to rotate said shaft and cams to cause said units to be alternately elevated and advanced to progressively move said elements over the surface of a plastic material to knead and compact the same, said elements comprising the means for moving said device.

7. A surface device comprising a plurality of elongated surface forming elements, upstanding members connected adjacent the forward and rear of said elements, cross members connecting alternate upstanding members to form units, said cross members provided with brackets, laterally extending shafts provided with oppositely mounted cam members, said shafts rotatably mounted in said brackets, a platform carried by said upstanding members, and power means mounted on said platform and adapted to rotate said shafts and cams to cause said units to be alternately elevated and advanced to progressively move said elements over the surface of a plastic material to knead and compact the same, said elements carrying said device.

8. A surfacing device comprising a plurality of elongated surface forming elements, upstanding members connected adjacent the forward and rear of said elements, means for varying the angular relation between said elements, cross members connecting alternate upstanding members to form units, said cross members provided with brackets, laterally extending shafts provided with oppositely mounted cam members, said shafts rotatably mounted in said brackets, a platform carried by said upstanding members, and power means mounted on said platform and adapted to rotate said shafts and cams to cause said units to be alternately elevated and advanced to progressively move said elements over the surface of a plastic material to knead and compact the same.

HENRY G. LYKKEN.

CERTIFICATE OF CORRECTION.

Patent No. 1,988,660. January 22, 1935.

HENRY G. LYKKEN.

It is hereby certified that error appears in the printed specification of the above numbered patent requiring correction as follows: Page 2, second column, after line 75, claim 3, insert the words alternate elements to form units, means for vary-; and that the said Letters Patent should be read with this correction therein that the same may conform to the record of the case in the Patent Office.

Signed and sealed this 12th day of March, A. D. 1935.

(Seal)

Leslie Frazer
Acting Commissioner of Patents.